US005581211A

United States Patent [19]

Kimura

[11] Patent Number: 5,581,211

[45] Date of Patent: Dec. 3, 1996

[54] SQUARING CIRCUIT CAPABLE OF WIDENING A RANGE OF AN INPUT VOLTAGE

[75] Inventor: Katsuji Kimura, Tokyo, Japan

[73] Assignee: NEC Corporation, Tokyo, Japan

[21] Appl. No.: 514,228

[22] Filed: Aug. 11, 1995

[30] Foreign Application Priority Data

Aug. 12, 1994 [JP] Japan .................................... 6-212118

[51] Int. Cl.⁶ ........................................ G06F 7/556

[52] U.S. Cl. ........................... 327/356; 327/103; 327/349

[58] Field of Search .................................... 327/103, 349, 327/356

[56] References Cited

U.S. PATENT DOCUMENTS

| | | | |
|---|---|---|---|
| 3,793,480 | 2/1974 | Waehner | 327/356 |
| 4,546,275 | 10/1985 | Pena-Final et al. | 327/349 |
| 5,357,149 | 10/1994 | Kimura | 327/512 |

OTHER PUBLICATIONS

Kimura, Katsuji, "A Unified Analysis of Four-Quadrant Analog Multipliers Consisting of Emitter and Source-Coupled Transistors Operable on Low Supply Voltage", *IEICE Transactions on Electronics*, vol. 376-C, No. 5, May 1993, pp. 714–737.

*Primary Examiner*—Margaret Rose Wambach
*Attorney, Agent, or Firm*—Sughrue, Mion, Zinn, Macpeak & Seas

[57] ABSTRACT

In a squaring circuit which responds to an input voltage to produce an output current and which is specified by a squaring characteristic between the input voltage and the output current, first, second, and third transistors are connected in common to a constant current source while the first and the second transistors are connected to input terminals for the input voltage and also connected in common to a single output terminal. The third transistor is connected to another output terminal and supplied with a d.c. voltage as a control signal. The output current appears between the output terminals as a differential output current. The squaring characteristic is kept even when the input voltage is widely varied. Each of the first through the third transistors may be either a bipolar transistor or a MOS transistor.

17 Claims, 5 Drawing Sheets

SQUARING CIRCUIT CAPABLE OF WIDENING A RANGE OF AN INPUT VOLTAGE

BACKGROUND OF THE INVENTION

This invention relates to a squaring circuit which is capable of exhibiting a squaring characteristic relative to an input signal or voltage.

Conventionally, a squaring circuit of the type described has been proposed by the instant inventor in a paper which has been contributed to IEICE Transactions on Electronics and which has been published in Vol. E76-C, No. 5, May 1993, page 722. The squaring circuit has a pair of input terminals given an input voltage and a pair of output terminals across which a differential output current appears as an output current. In the squaring circuit, a relationship between the input voltage and the output current is represented by a transfer characteristic which can be approximated by a squaring curve.

More specifically, the squaring circuit proposed in the paper is structured by four transistors driven by a single constant current source. In this connection, the four transistors have emitters connected in common to the constant current source while two of the transistors have bases connected in common to each other so as to be connected to each of the input terminals. In addition, each pair of the transistors has collectors connected in common to each other to provide each of the output terminals.

The squaring circuit mentioned above is called a quadritail cell in the paper because the four transistors are driven by a single tail current source.

At any rate, the four transistors are driven by the single tail current source in the above-mentioned quadritail cell. This means that it is difficult to reduce a current consumed in each transistor. In addition, the squaring circuit mentioned in the paper is disadvantageous in that improvement of a high frequency characteristic inevitably brings about an increase of a drive current.

SUMMARY OF THE INVENTION

It is an object of this invention to provide a squaring circuit which is capable of reducing consumption of a current.

It is another object of this invention to provide a squaring circuit of the type described, which is excellent in a high frequency characteristic.

It is still another object of this invention to provide a squaring circuit of the type described, which is capable of accomplishing a squaring characteristic over a wide range of an input voltage.

It is yet another object of this invention to provide a squaring circuit of the type described, which can be structured by a small number of transistors.

A squaring circuit to which this invention is applicable has first and second input terminals and first and second output terminals and operable in response to an input voltage given across the first and the second input terminals to produce an output current which is specified by a squaring characteristic in relation to the input voltage. According to this invention, the squaring circuit comprises a constant current source, a d.c. voltage source for producing a d.c. voltage, first and second transistors which have input electrodes connected to the first and the second input terminals to be given the input voltage, respectively, output electrodes connected in common to the first output terminal, and internal electrodes to be connected to the constant current source, and a third transistor which has an input electrode supplied with the d.c. voltage, an output electrode connected to said second output terminal, and an internal electrode to be connected to the constant current source. The output current appears through at least one of the first and the second output terminals.

Specifically, the output current may be caused to flow through the first output terminal or the second output terminal. Alternatively, the output current may appear between the first and the second output terminals in the form of a differential output current.

In addition, a relationship between a thermal voltage $V_T$ and the d.c. voltage is specified by $\exp(V_C/V_T)$ which falls within a range between 5 and 20, both inclusive.

The first through the third transistors may be bipolar transistors or MOS transistors.

BRIEF DESCRIPTION OF THE INVENTION

FIG. 4 shows transconductance characteristics of

DESCRIPTION OF THE PREFERRED EMBODIMENTS

Figure 1:
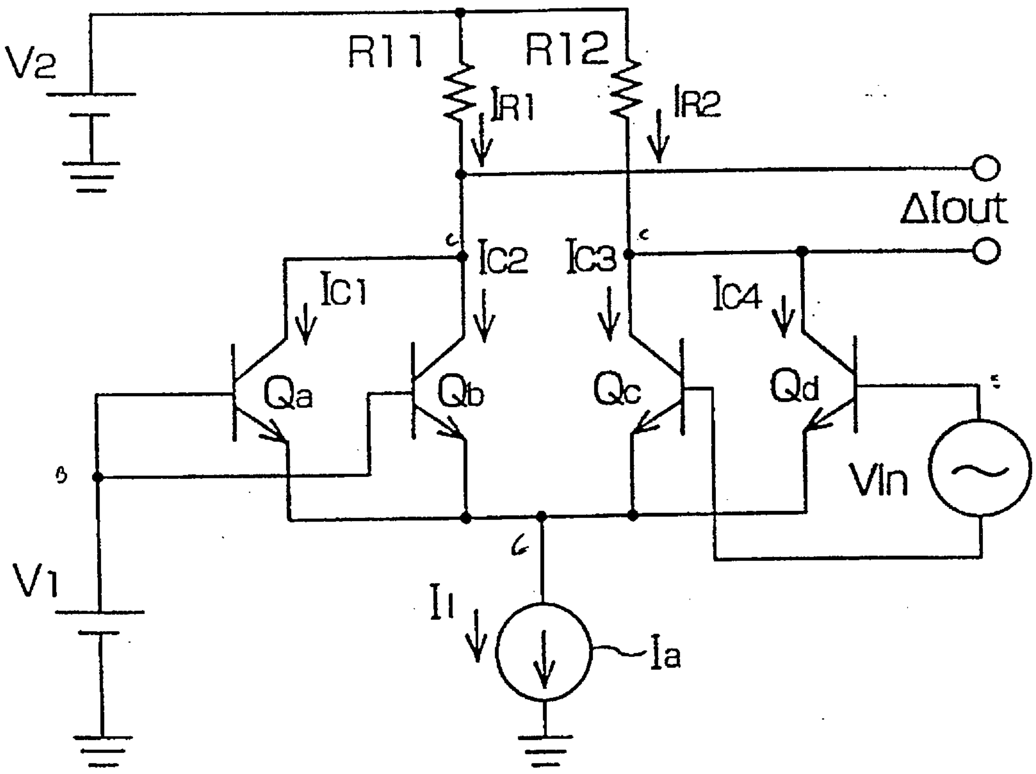
FIG. 1 PRIOR ART
FIG. 1 is a circuit diagram of a conventional squaring circuit.

Referring to FIG. 1, a conventional squaring circuit includes first, second, third, and fourth bipolar transistors Qa, Qb, Qc, and Qd which have emitters connected in common to one another and to a single constant current source Ia. Bases of the first and the second bipolar transistors Qa and Qb are connected in common to each other and are connected to a first voltage source to develop a first d.c. voltage $V_1$ while an input voltage Vin is given across bases of the third and the fourth transistors Qc and Qd.

In addition, collectors of the first and the second bipolar transistors Qa and Qb are connected in common to each other and connected through resistors R11 and R12 to a second voltage source which produces a second d.c. voltage $V_2$.

With this structure, when the input voltage Vin is developed across the bases of the third and the fourth bipolar transistors Qc and Qd, resistor currents $I_{R1}$ and $I_{R2}$ are caused to flow through the resistors R1 and R2, respectively, and allow first through fourth collector currents $I_{C1}$ to $I_{C4}$ to flow through the first through the fourth bipolar transistors Qa to Qd, respectively. A pair of output terminals is derived from a point of connections between the first and the second bipolar transistors Qa and Qb and another point of connection between the third and the fourth bipolar transistors Qc and Qd.

A differential output current appears between the output terminals and exhibits a squaring characteristic relative to the input voltage Vin, according to the inventor's analysis made in the paper referenced in the preamble of the instant specification.

However, the illustrated squaring circuit has shortcomings as mentioned in the preamble of the instant specification.

Figure 2:
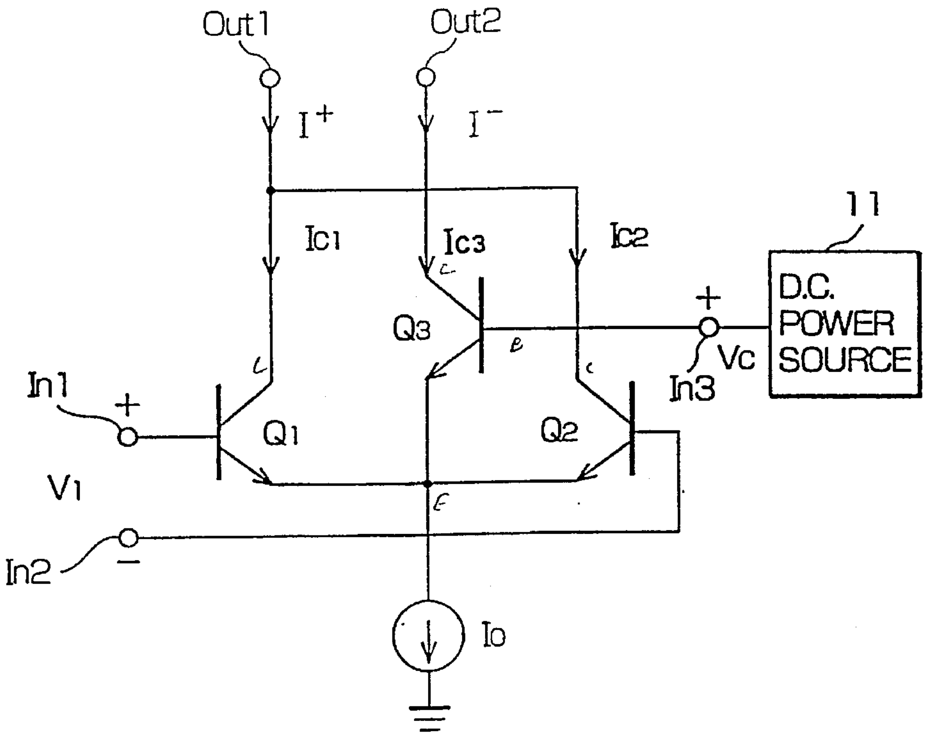
FIG. 2 is a circuit diagram of a squaring circuit according to a first embodiment of this invention.

Referring to FIG. 2, a squaring circuit according to a first embodiment of this invention has first and second input terminals In1 and In2 and first and second output terminals Out1 and Out2. In the illustrated example, the squaring circuit has a third input terminal In3 also.

The squaring circuit comprises first through third bipolar transistors depicted at Q1, Q2, and Q3 which have emitters directly connected in common to one another in the illustrated example and connected to a single constant current source which can cause a constant current Io to flow therethrough. The emitters of the first through the third bipolar transistors Q1 to Q3 may be referred to as internal electrodes for convenience of description. Collectors of the first and the second bipolar transistors Q1 and Q2 are connected in common to the first output terminal Out1 while a collector of the third bipolar transistor Q3 is connected to the second output terminal Out2. In this connection, the collectors of the first through the third bipolar transistors Q1 to Q3 may be called output electrodes. Moreover, a base of the third bipolar transistor Q3 is connected to the third input terminal In3 to which a d.c. input voltage $V_C$ is supplied from a d.c. power source 11. Thus, the bases of the first through the third bipolar transistors Q1 to Q3 serve as input electrodes.

An input voltage $V_1$ is given across bases of the first and the second bipolar transistors Q1 and Q2 while a first output current $I^+$ is caused to flow through the collectors of the first and the second bipolar transistors Q1 and Q2 through the first output terminal Out1 when the input voltage $V_C$ is given to the third bipolar transistor Q3. The first output current I+is ramified or divided into first and second collector currents $I_{C1}$ and $I_{C2}$ which are caused to flow through the first and the second bipolar transistors Q1 and Q2, respectively. Therefore, the first output current $I^+$ is equal to a sum of the first and the second collector currents $I_{C1}$ and $I_{C2}$.

Practically, the input voltage $V_1$ is given to the first input terminal In1 in the form of $((V_1/2)+V_R)$ and to the second input terminal In2 in the form of $((-V_1/2)+V_R)$, where $V_R$ is representative of a reference voltage. In this connection, plus (+) and minus (−) signs are attached to the first and the second input terminals In1 and In2 and the input voltage $V_1$ may be called a differential voltage. Likewise, the d.c. input voltage $V_C$ is given to the third input terminal In3 in the form of $(V_C+V_R)$ The collector of the third bipolar transistor Q3 is connected to the second output terminal Out2 through which a second output current $I^-$ is caused to flow through the third bipolar transistor Q3 as a third collector current $I_{C3}$.

Thus, the illustrated squaring circuit includes three bipolar transistors and may be referred to as a triple-tail cell.

Now, description will be made hereinunder on the assumption that the first through the third bipolar transistors Q1 to Q3 are well matched in characteristics with one another and that the basewidth modulation is neglected.

Under the circumstances, the first through the third collector currents $I_{C1}$ to $I_{C3}$ are given by Equations 1:

$$\left.\begin{aligned} I_{C1} &= I_S \exp\left(\frac{V_R - V_E + (1/2)V_1}{V_T}\right) \\ I_{C2} &= I_S \exp\left(\frac{V_R - V_E - (1/2)V_1}{V_T}\right) \\ I_{C3} &= I_S \exp\left(\frac{V_R - V_E + V_C}{V_T}\right) \end{aligned}\right\} \tag{1}$$

where $I_S$ is representative of the saturation current of bipolar transistors Q1 to Q3; $V_R$, a d.c. voltage of the input voltage $V_1$; $V_E$, a common emitter voltage of the triple-tail cell; $V_T$, the thermal voltage which is given by:

$$V_T = kT/q,$$

where, in turn, k is representative of Boltzmann's constant; q, the charge of an electron; and T, absolute temperature.

On the other hand, a tail current of the triple-tail cell is given by:

$$I_{C1}+I_{C2}+I_{C3}=\alpha F\ Io, \tag{2}$$

where α F represents a d.c. common-base current gain factor.

If the first through the third bipolar transistors Q1 to Q3 have the same characteristics, the first through the third collector currents $I_{C1}$ to $I_{C3}$ represented by Equations 1 include a common term specified by $I_S\exp((V_R-V_E)/V_T)$.

From Equations 1 and 2, it is found out that the common term is rewritten into:

$$I_S \exp\left(\frac{V_R - V_E}{V_T}\right) = \frac{\alpha_F Io}{2\cosh(V_1/2V_T) + \exp(V_C/V_T)} \tag{3}$$

Likewise, the first output current $I^+$ $(=I_{C1}+I_{C2})$ and the second output current $I^-$ $(=I_{C3})$ are given by:

$$\begin{aligned} I^+ &= I_{C1} + I_{C2} \\ &= \frac{2\alpha_F Io \cosh(V_1/2V_T)}{2\cosh(V_1/2V_T) + \exp(V_C/V_T)} \end{aligned} \tag{4}$$

$$\begin{aligned} I^- &= I_{C3} \\ &= \frac{\alpha_F Io \exp(V_C/V_T)}{2\cosh(V_1/2V_T) + \exp(V_C/V_T)} \end{aligned} \tag{5}$$

Accordingly, a differential output current $\Delta I_C$ which is represented by a difference between the first and the second output currents $I^+$ and $I^-$ is given by:

$$\begin{aligned} \Delta I_C &= (I_{C1} + I_{C2}) - I_{C3} \\ &= \frac{\alpha_F Io\,(2\cosh(V_1/2V_T) - \exp(V_C/V_T))}{2\cosh(V_1/2V_T) + \exp(V_C/V_T)} \end{aligned} \tag{6}$$

Figure 3:
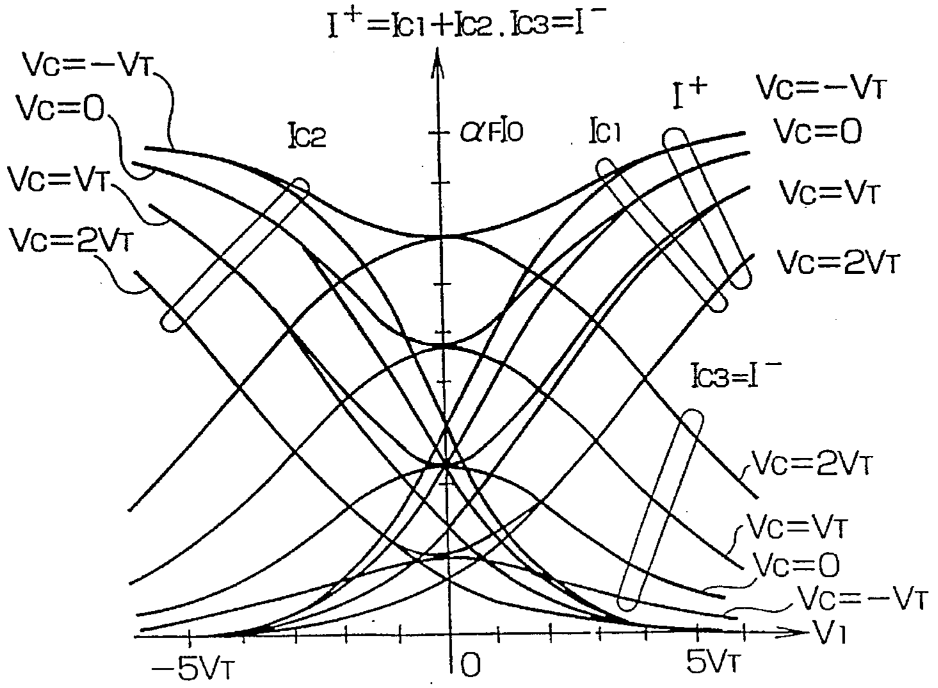
FIG. 3 shows transfer characteristics of the squaring circuit illustrated in FIG. 2.

Referring to FIG. 3, a relationship of Equation 6 is illustrated by curves each of which is drawn by varying the d.c. input voltage in relation to the thermal voltage $V_T$. The relationship specified by the curve may be called a transfer characteristic between the input voltage $V_1$ and the differential output current $\Delta I_C$.

As is apparent from FIG. 3, the curves can be substantially regarded as squaring curves and are variable by varying the d.c. input voltage $V_C$. In this connection, the d.c. input voltage $V_C$ may be called a control signal or a control voltage. In addition, it is possible to change a range of the input voltage $V_1$ by varying the d.c. input voltage $V_C$, as shown in FIG. 3 and to equivalently change coefficients of the squaring terms. In fact, the squaring curves can be obtained even when the input voltage $V_1$ is varied between 5 $V_T$ and −5 $V_T$, as readily understood from FIG. 3.

In general, it is possible to determine a range of the input voltage $V_1$ by differentiating a parabolic curve and by rendering a derivative of the parabolic curve into a straight line. To this end, a condition is investigated such that a derivative $d(\Delta I_C)/dV_1$ indicates a straight line. Specifically, differentiating Equation 6 by the input voltage $V_1$ gives:

$$\frac{d(\Delta I_C)}{dV_1} = \frac{2\alpha_F Io}{V_T} \frac{\exp(V_C/V_T)\sinh(V_1/2V_T)}{\{2\cosh(V_1/2V_T)+\exp(V_C/V_T)\}^2} \quad (7)$$

Moreover, the condition that $d(\Delta I_C)/dV_1$ becomes maximally flat at $V_1=0$ is given by the fourth-order derivative of Equation 6 and by substituting 0 for $V_1$ and is written into:

$$d^4(\Delta I_C)/dV_1^4 \Big|_{V_1=0} = 0 \quad (8)$$

From Equation 8, it is possible to obtain $\exp(V_C/V_T)=10$, namely, $V_C=V_T\ln 10=2.3056\ V_T$.

Herein, let the third bipolar transistor Q2 have an emitter area ratio of K relative to the first and the second bipolar transistors Q1 and Q2, where K is greater than unity. In this event, it is possible from Equation 8 to obtain $K \exp(V_C/V_T)=10$, namely, $V_C=V_T\ln(10/K)$.

When the above-mentioned condition is satisfied, the range of the input voltage in the squaring circuit illustrated in FIG. 2 becomes maximally flat and becomes very wide.

Figure 4:
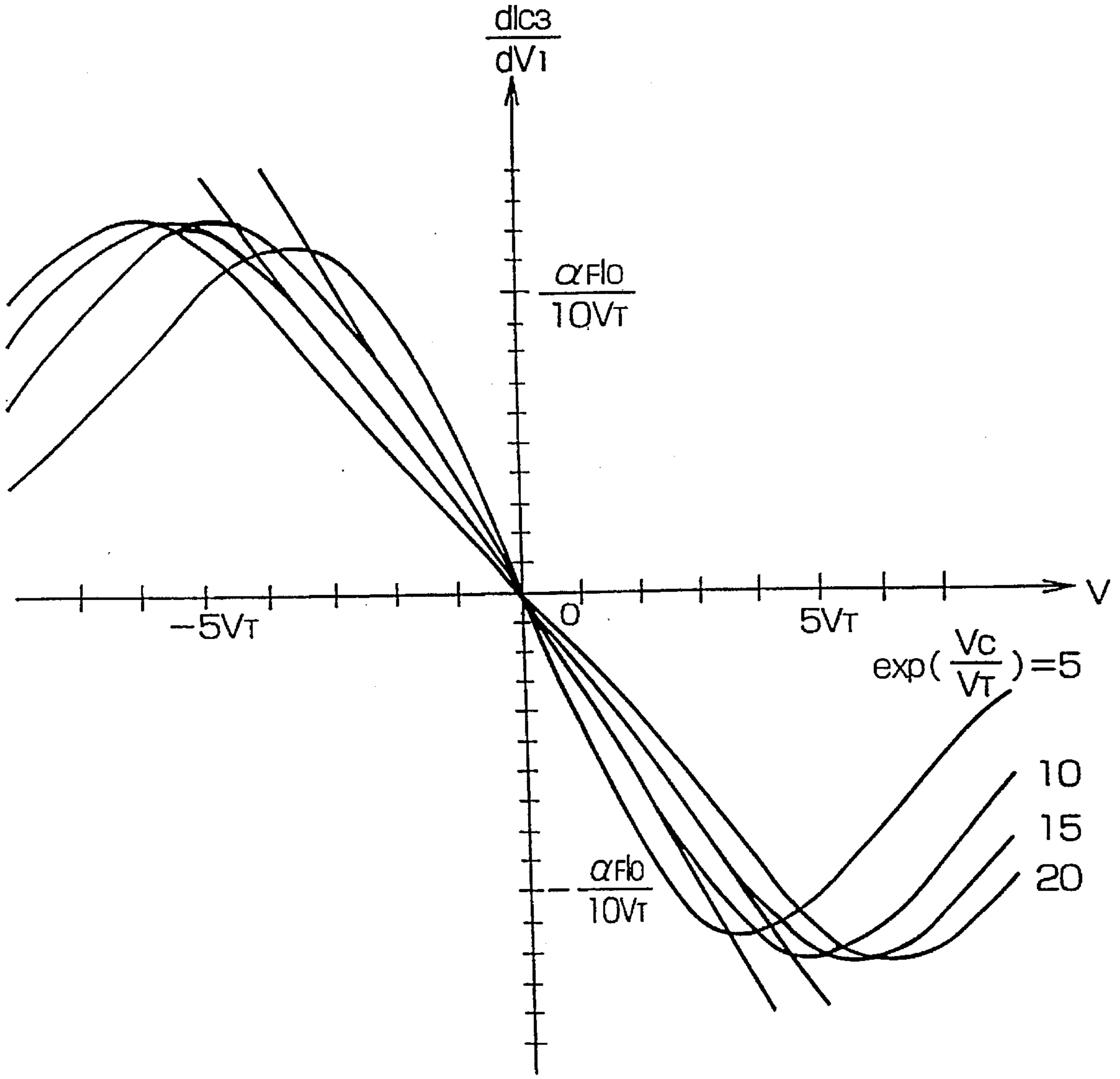

Referring to FIG. 4, illustration is made about transconductance characteristics which are specified by characteristics of $I^+$ and $I^-$ ($=I_{C3}$) obtained when $V_C$ is taken as parameter. As shown in FIG. 4, illustrated curves or characteristics may be regarded as squaring characteristics when $\exp(V_C/V_T)$ falls within a range between 5 and 20. This means that the range of the input voltage $V_1$ which may be regarded as the squaring characteristics is widened about twice the range of the conventional squaring circuit illustrated in FIG. 1. Herein, it is to be noted that the squaring characteristics can be accomplished in connection with each of the first and the second output currents $I^+$ and $I^-$, as readily understood from FIG. 3. This means that a differential output current $(I^+-I^-)$ also exhibits a squaring characteristic.

Figure 5:
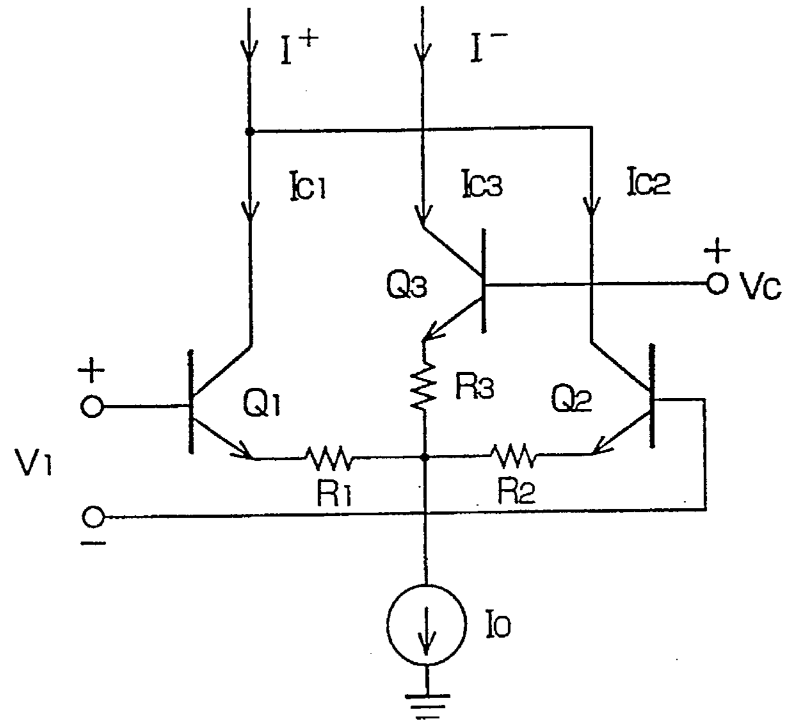
FIG. 5 is a circuit diagram according to a second the squaring circuit illustrated in FIG. 2; embodiment of this invention.

Referring to FIG. 5, a squaring circuit according to a second embodiment of this invention is similar to that illustrated in FIG. 2 except that the emitters of the first through the third bipolar transistors Q1 to Q3 are connected through first through third resistors R1 to R3 in common to one another. With this structure, the range of the input voltage $V_1$ can be further widened by connecting the first through the third resistors R1 to R3 to the emitters of the first through the third transistors Q1 to Q3.

Figure 6:
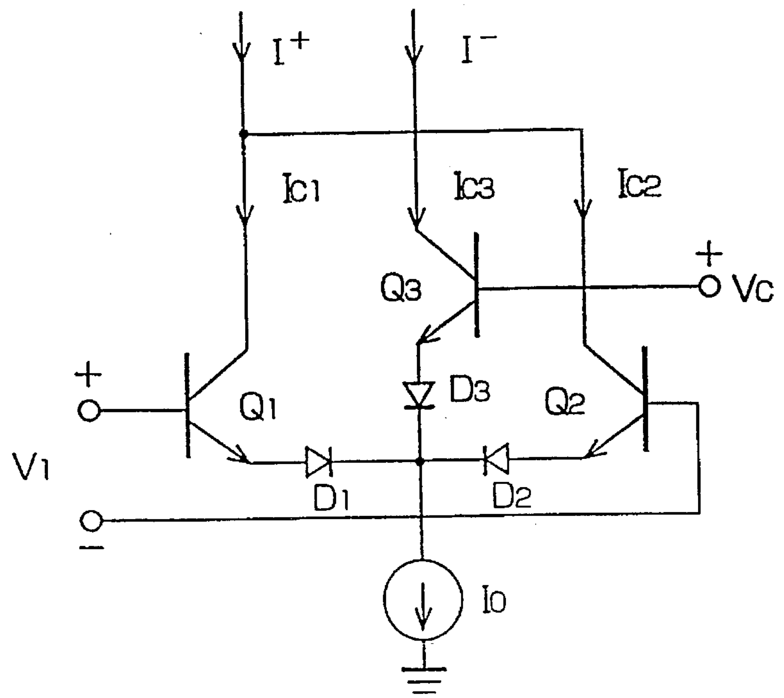
FIG. 6 is a circuit diagram according to a third embodiment of this invention.

Referring to FIG. 6, a squaring circuit according to a third embodiment of this invention is also similar in structure to that illustrated in FIG. 2 except that the emitters of the first through the third bipolar transistors Q1 to Q3 are connected through first to third diodes D1 to D3 in common to one another. Such connections of the diodes D1 to D3 serve to render the range of the input voltage V1 into twice the range of the input voltage in the conventional squaring circuit illustrated in FIG. 1.

Figure 7:
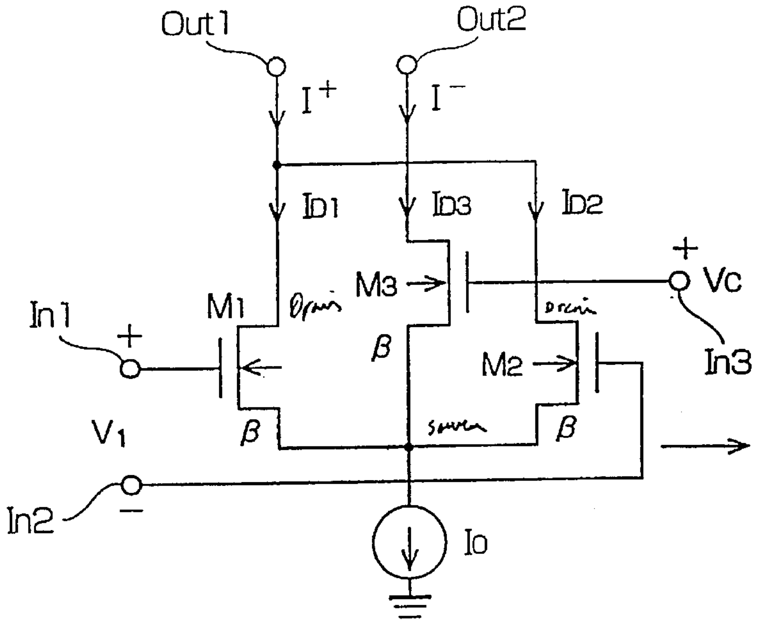
FIG. 7 is a circuit diagram according to a fourth embodiment of this invention.

Referring to FIG. 7, a squaring circuit according to a fourth embodiment of this invention includes first through third MOS (Metal-Oxide-Semiconductor) transistors M1 to M3, instead of the first through the third bipolar transistors Q1 to Q3 shown in FIG. 2, and may be therefore referred to as a triple-tail cell. As well known in the art, each of the MOS transistors M1 to M3 has drain, source, and gate electrodes which may be referred to as output, internal, and input electrodes, respectively.

Like in FIG. 1, the illustrated squaring circuit has first through third input terminals In1 to In3 and first and second output terminals Out1 and Out2. As mentioned in connection with FIG. 2, an input voltage $V_1$ which may be called a differential signal is given across the first and the second input terminals In1 and In2 while a d.c. voltage $V_C$ is given to the third input terminal In3 as a control signal.

On the other hand, a first output current $I^+$ is caused to flow through the first output terminal Out1 while a second output current $I^-$ is caused to flow through the second output terminal Out2. A differential output current $\Delta I_D$ is also caused to flow between the first and the second output terminals Out1 and Out2 and is equal to a difference between the first and the second output currents $I^+$ and $I^-$.

The drain or output electrodes of the first and the second MOS transistors M1 and M2 are connected in common to the first output terminal Out1 while the source or internal electrodes of the first through the third MOS transistors M1 to M3 are connected in common to a single constant current source which causes a constant current Io to flow therethrough. The gate or input electrodes of the first and the second MOS transistors M1 and M2 are connected to the first and the second input terminals In1 and In2, respectively, and are supplied with the input voltage $V_1$. The gate electrode of the third MOS transistor M3 is connected to the third input terminal In3 and is given the d.c. voltage $V_C$.

On the assumption that elements, such as the MOS transistors, are well matched with one another on the same chip, the channel-length modulation and the body effect are neglected. Under the circumstances, it can be assumed that a relationship between each drain current $I_{D1}$ to $I_{D3}$ and each gate-source voltage complies with the square-law when each MOS transistor M1 to M3 is operating in the saturation region. In this event, the drain currents $I_{D1}$ to $I_{D3}$ are given by:

$$\left.\begin{aligned} I_{D1} &= \beta\left(V_R - V_S + \frac{1}{2}V_1 - V_{TH}\right)^2 && \left(V_R - V_S - \frac{1}{2}V_1 \geqq V_{TH}\right) \\ I_{D1} &= 0 && \left(V_R - V_S - \frac{1}{2}V_1 \leqq V_{TH}\right) \end{aligned}\right\} \quad (9)$$

$$\left.\begin{aligned} I_{D2} &= \beta\left(V_R - V_S - \frac{1}{2}V_1 - V_{TH}\right)^2 && \left(V_R - V_S + \frac{1}{2}V_1 \geqq V_{TH}\right) \\ I_{D2} &= 0 && \left(V_R - V_S + \frac{1}{2}V_1 \leqq V_{TH}\right) \end{aligned}\right\} \quad (10)$$

-continued $$\left.\begin{array}{ll} I_{D3}=\beta\,(V_R-V_S+V_C-V_{TH})^2 & (V_R-V_S-V_C\geqq V_{TH}) \\ I_{D3}=0 & (V_R-V_S-V_C\leqq V_{TH}) \end{array}\right\} \quad (11)$$

where β is representative of the transconductance parameter; $V_S$, a common source voltage in the triple-tail cell; and $V_{TH}$, the threshold voltage.

Herein, the transconductance parameter β is given by:

$$\beta=\mu(Cox/2)\,(W/L),$$

where μ stands for an effective mobility; Cox, a capacitance per unit area in a gate oxide film used in each MOS transistor M1 to M3; W, a gate width; and L, a gate length.

In the triple-tail cell illustrated in FIG. 7, a tail current is equal to the constant current Io which is given by:

$$Io=I_{D1}+I_{D2}+I_{D3}. \quad (12)$$

From Equations 9 through 12, the first output current $I^+$ ($=I_{D1}+I_{D2}$) and the second output current $I^-$ ($=I_{D3}$) are represented by:

$$\begin{aligned} I^+ &= I_{D1}+I_{D2} \quad (13)\\ &= \frac{2}{3}\,Io+\frac{1}{6}\,\beta V_1^2+\frac{4}{9}\,\beta V_C^2-\\ &\quad \frac{4}{9}\,\beta V_C\times\sqrt{\frac{3Io}{\beta}-\frac{3}{2}\,V_1^2-2V_C^2} \end{aligned}$$

$$\begin{aligned} I^- &= I_{D3} \quad (14)\\ &= \frac{1}{3}\,Io-\frac{1}{6}\,\beta V_1^2-\frac{4}{9}\,\beta V_C^2+\\ &\quad \frac{4}{9}\,\beta V_C\times\sqrt{\frac{3Io}{\beta}-\frac{3}{2}\,V_1^2-2V_C^2} \end{aligned}$$

when the first through the third MOS transistors M1 to M3 are operating within a range of an input voltage $V_1$ such that none of the MOS transistors M1 to M3 are put into cut-off states.

Accordingly, the differential output current $\Delta I_D$ is equal to $(I_{D1}+I_{D2})-I_{D3}$ and given by:

$$\begin{aligned} \Delta I_D &= (I_{D1}+I_{D2})-I_{D3} \quad (15)\\ &= \frac{1}{3}\,Io-\frac{1}{3}\,\beta V_1^2-\frac{8}{9}\,\beta V_C^2+\\ &\quad \frac{8}{9}\,\beta V_C\times\sqrt{\frac{3Io}{\beta}-\frac{3}{2}\,V_1^2-2V_C^2} \end{aligned}$$

As is apparent from Equation 15, a coefficient (⅓) of the second order term of the squaring circuit illustrated in FIG. 7 is not varied even when the d.c. voltage $V_C$ is changed from one to another. Under the circumstances, when $V_C=0$, Equations 13, 14, and 15 can be rewritten into:

$$I^+\Big|_{VC=0}=\frac{2}{3}\,Io+\frac{1}{6}\,\beta V_1^2 \quad (16)$$

$$I^-\Big|_{VC=0}=\frac{1}{3}\,Io-\frac{1}{6}\,\beta V_1^2 \quad (17)$$

$$\Delta I_D\Big|_{VC=0}=\frac{1}{3}\,Io+\frac{1}{3}\,\beta V_1^2 \quad (18)$$

respectively.

Figure 8:
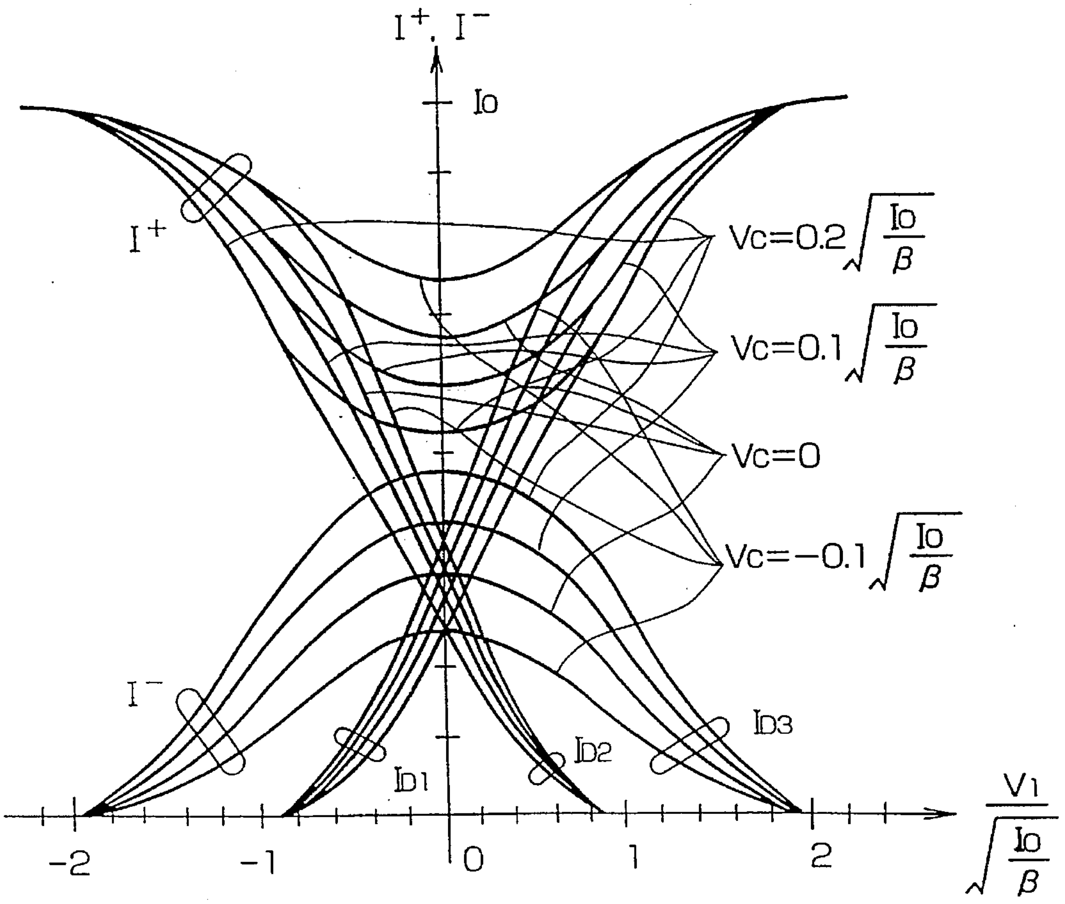
FIG. 8 shows transfer characteristics of the squaring circuit illustrated in FIG. 7.

Referring to FIG. 8, the transfer characteristics of the squaring circuit illustrated in FIG. 7 are shown so as to specify relationships between the input voltage $V_C$ and the output currents, such as $I^+$ and $I^-$. When the MOS transistors are used in the squaring circuit, the coefficients of the second order term are invariable even when the input voltage $V_C$ is varied. As shown in FIG. 8, each of the first and the second output currents $I^+$ and $I^-$ exhibits the squaring characteristics. In this connection, the differential output current ΔI also exhibits the squaring characteristic.

Thus, the squaring circuit according to this invention can be constituted by a small number of transistors, namely, three transistors. This enables a reduction of an amount of a drive current. Alternatively, when the drive current is kept at the same value as the convention squaring circuit illustrated in FIG. 1, a current which is caused to flow through each transistor is increased by about 50%. Such an increase of the current results in an improvement of a high frequency characteristic. To the contrary, when the frequency characteristic is identical with the conventional one, the tail current can be reduced, which serves to save current consumption.

While this invention has thus far been described in conjunction with a few embodiments thereof, it will be readily possible for those skill in the art to put this invention into practice in various other manners. For example, a plural sets of the triple-tail cells are connected in parallel to one another. In FIG. 7, resistors or diodes may be connected to the sources of the MOS transistors M1 to M3, like in FIGS. 2 and 5.

What is claimed is:

1. A squaring circuit having first and second input terminals and first and second output terminals and operable in response to an input voltage provided across said first and said second input terminals to produce an output current which is specified by a squaring characteristic in relation to said input voltage, said squaring circuit comprising:

- a constant current source;
- a d.c. voltage source for producing a d.c. voltage;
- first and second transistors each having input electrodes connected to said first and said second input terminals, respectively, output electrodes connected in common to said first output terminal, and internal electrodes connected to said constant current source; and
- a third transistor which has an input electrode supplied with said d.c. voltage, an output electrode connected to said second output terminal, and an internal electrode connected to said constant current source;
- said first through third transistors being connected to said constant current source in a triple tail cell configuration so as to produce said output current with said squaring characteristic;
- said output current appearing through at least one of said first and said second output terminals.

2. A squaring circuit as claimed in claim 1, wherein said output current is caused to flow through said first output terminal.

3. A squaring circuit as claimed in claim 1, wherein said output current is caused to flow through said second output terminal.

4. A squaring circuit as claimed in claim 1, wherein said output current appears between said first and said second output terminals in the form of a differential output current.

5. A squaring circuit as claimed in claim 1, wherein said third transistor is specified by a relationship between a thermal voltage $V_T$ and said d.c. voltage represented by $V_C$.

6. A squaring circuit as claimed in claim 5, wherein the relationship between said thermal voltage $V_T$ and the d.c. voltage is specified by $\exp(V_C/V_T)$ which falls within a range between 5 and 20, both inclusive.

7. A squaring circuit as claimed in claim 6, wherein the first through the third transistors are formed by bipolar transistors.

8. A squaring circuit as claimed in claim 7, wherein said input electrodes of the first through the third transistors are bases while the output electrodes of the first through the third transistors are collectors and the internal electrodes of the first through the third transistors are emitters.

9. A squaring circuit as claimed in claim 8, wherein the emitters of the first through the third transistors are directly connected in common to one another to be connected to said constant current source.

10. A squaring circuit as claimed in claim 8, wherein the emitters of the first through the third transistors are connected through resistors to said constant current source in common.

11. A squaring circuit as claimed in claim 8, wherein the emitters of the first through the third transistors are connected through diodes to said constant current source.

12. A squaring circuit as claimed in claim 1, wherein the first through the third transistors are formed by first through third MOS transistors, respectively.

13. A squaring circuit as claimed in claim 12, wherein the first through the third MOS transistors have drain electrodes as said output electrodes, gate electrodes as said input electrodes, and source electrodes as said internal electrodes.

14. A squaring circuit as claimed in claim 13, wherein the drain electrodes of the first and the second MOS transistors are connected to said first output terminal in common while the drain electrode of the third MOS transistor is connected to said second output terminal;

the source electrodes of the first through the third MOS transistors being connected in common to one another;

the input voltage being supplied across the gate electrodes of the first and the second MOS transistors while the d.c. voltage is supplied to said gate electrode of the third MOS transistor.

15. A squaring circuit as claimed in claim 14, wherein said output current is caused to flow through the first output terminal.

16. A squaring circuit as claimed in claim 14, wherein said output current is caused to flow through the second output terminal.

17. A squaring circuit as claimed in claim 14, wherein said output current appears between the first and the second output terminals in the form of a differential output current.

* * * * *